Figure 1:
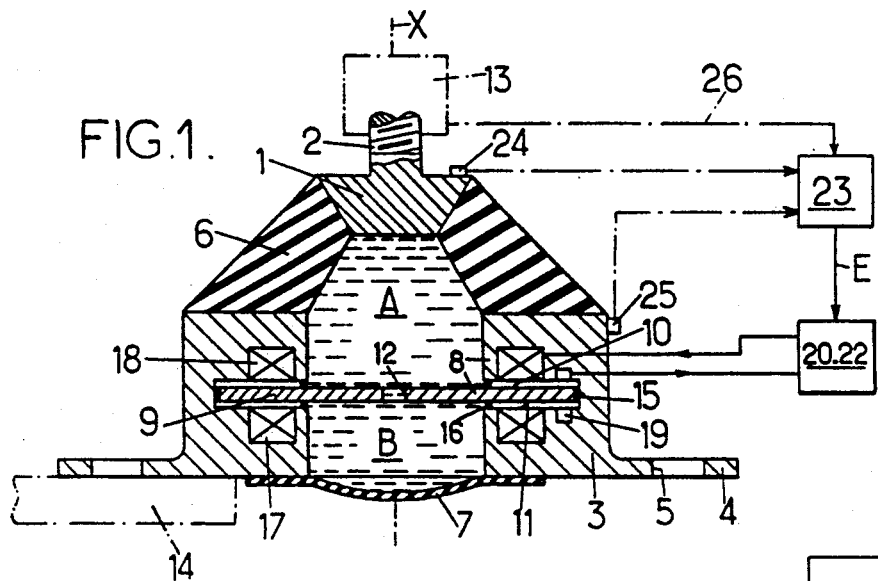

United States Patent [19]
Gennesseaux

[11] Patent Number: 5,116,029
[45] Date of Patent: May 26, 1992

[54] HYDRAULIC ANTIVIBRATORY DEVICES

[75] Inventor: André Gennesseaux, Chalette/Loing, France

[73] Assignee: Hutchinson, France

[21] Appl. No.: 648,526

[22] Filed: Jan. 30, 1991

[30] Foreign Application Priority Data

Jan. 30, 1990 [FR] France ............... 90 01075
Sep. 19, 1990 [FR] France ............... 90 11559

[51] Int. Cl.[5] .............................................. F16M 1/00
[52] U.S. Cl. ..................... 367/140.1 AE; 267/219
[58] Field of Search ........... 267/140.1 AE, 140.1 E, 267/140.1 A, 140.1 R, 35, 219, 140.2; 248/550, 562, 566, 636, 638

[56] References Cited

U.S. PATENT DOCUMENTS 4,650,170 3/1987 Fukushima ............. 267/140.1 AE
4,678,203 7/1987 Röhner et al. .............. 267/64.28
4,793,599 12/1988 Ishioka ........................ 248/636

Primary Examiner—Robert J. Oberleitner
Assistant Examiner—Chris Schwartz
Attorney, Agent, or Firm—Larson and Taylor

[57] ABSTRACT

A hydraulic antivibratory support is disclosed comprising two rigid frames, an elastomer structure forming therewith two sealed chambers, a restricted passage causing the two chambers to communicate permanently with each other, a liquid mass filling the two chambers and the restricted passage, a rigid ferromagnetic movable member partially defining one of the two chambers, and electric coils for applying alternating forces to this movable member, said movable member being guided axially and the air gaps being isolated from the liquid. A control system is provided making the electric energization of the coils dependent on the axial movements of the movable member itself by means of a sensor so as to reduce movements of the movable member.

19 Claims, 3 Drawing Sheets

HYDRAULIC ANTIVIBRATORY DEVICES

The invention relates to hydraulic antivibratory devices to be fitted, for damping, connection and even support purposes, between two rigid elements such as the chassis of a vehicle and the engine of this vehicle.

It relates more particularly, among such devices, to those which comprise:

two rigid frames which can be firmly secured to the two rigid elements to be joined together, an elastomer spacer structure connecting the two frames together and forming at least partially therewith two sealed chambers, a restricted passage causing the two chambers to communicate permanently with each other, a liquid mass filling the two chambers and the restricted passage, and rigid movable members partially defining one of the two chambers and mounted so as to be able to move with a limited amplitude of movement.

As is known, with such a device:

oscillations of relatively high amplitude (i.e. greater than 0.5 mm) and/or relatively low frequency (namely about 5 to 15 Hz), such as those due to the "hash" generated on the vehicle by bumps in the road, cause the liquid from one of the two chambers to be driven into the other and conversely through the restricted passage. The resonance of the liquid mass thus driven when the frequency of the oscillations reaches a predetermined value, which depends on the ratio between the axial length and the cross section of the restricted passage, ensures excellent damping of the oscillations concerned.

Vibrations, of relatively low amplitude (less than 0.5 mm) and of relatively high frequency (generally between 20 and 200 Hz), such as those due to the operation of the engine, result in vibrations of the movable members likely to attenuate or filter out the transmission of the vibrations in question.

In known devices of the kind in question, the movable member is generally free to move between its two stops and it is the vibrations to which it is naturally subjected as a function of the vibrations to be damped which are used for the desired attenuation purposes.

To increase this attenuating or filtering effect, attempts have already been made to suppress the "natural" character of the useful and usable vibrations of the movable member by modifying them in an artificial and imposed way, which method is sometimes called "active attenuation".

For this, it has been proposed to form the movable member at least partially by a ferromagnetic element and to apply "counter vibrations" to this element, by means of electric coils, i.e. alternating forces of the same frequency as the vibrations to be reduced which are oriented parallel to these vibrations and in the opposite direction U.S. Pat. No. 4,650,170.

To improve the response of the movable member to these forces, it has been further proposed:

to guide the movable member by at least one deformable ring so that it can only move in translation in the "axial" direction of the vibrations to which it is subjected, and to separate the gaps between the movable member and the coils from the damping liquid by at least one tight annular seal see U.S. Pat. No. 4,793,599.

But the solutions thus proposed are not satisfactory in practice, because energization of the electric coils controlling the counter vibrations is made dependent not in a closed loop on the vibrations of the movable member but in an open loop on the vibrations of the vehicle engine giving rise to the vibrations to be damped and therefore rigidly connected to one of the two rigid frames of the device, with no control over the results obtained.

In fact, under such conditions, when the device is subjected to low frequency oscillations of high amplitude, nothing prevents the movable member from coming into contact with its stops at the rhythm of the oscillations, so that it is blocked at the times corresponding to such applications and it can no longer then be subjected to useful vibrations as described above: the attenuation of the vibrations to be damped is then cancelled out at the rhythm of said oscillations.

The purpose of the invention is to provide efficient active attenuation in particular for overcoming the drawback which has just been mentioned.

For this, an antivibratory device of the kind in question according to the invention still comprises a movable member mounted so as to be movable with a limited amplitude of free movement and an electrically energized force applying member adapted to apply alternating forces to this movable member, and it is essentially characterized in that it is associated, with a control system making the electric power supply of the force applying member dependent on the movements of the movable member itself so that energization due to this control system alone results in reducing, even cancelling out, such movements, the control system comprising for this purpose a sensor detecting the movements disposed in the immediate vicinity of the movable member.

In advantageous embodiments, recourse is further had to one and/or other of the following arrangements:

the movable member is formed at least partially by a laminate ferromagnetic element and the force applying member is formed by at least one fixed electric coil associated with a fixed laminate magnetic circuit which is separated from the element by at least one air gap, the laminate magnetic circuit circularly surrounds an axis X and each coil is formed by a crown with axis X of elementary axial coils whose magnetic cores are formed from magnetic material foils parallel to axis X and wound cylindrically about this axis, the resulting annular disc being cut by radial grooves which leave therebetween flat ribs in the form of circular sectors forming said cores, in a device in which the ferromagnetic element is in the form of a flat disc, the laminate magnetic circuit is formed by rectilinear tunnels open towards the disc and formed by stacking identical metal sheets in the form of a thick U, in a device in which the ferromagnetic element is in the form of a flat disc with axis X, the laminate magnetic circuit is formed by a circular tunnel with axis X open towards the disc and composed of identical metal sheets in the form of a thick U parallel to axis X and disposed in star fashion about this axis, the movable member is in the general form of a table with a single central leg and two parallel circular plates, the upper face of the upper plate partially defining one of the two chambers, and at least the annular external portion of the intermediate plate forming the ferromagnetic element, the force applying member is formed by an electric wire winding carried by the movable member and means are provided for applying a permanent magnetic field to this winding, the device further comprises two sensors adapted for detecting respectively the vibrations of the two rigid frames and a second automatic control system adapted for delivering, from the data collected by these two sensors and possibly from additional data coming more particularly from a vehicle engine giving rise to the vibrations to be damped, electric signals for supplying the force applying member with power, which signals are adapted to impose on the movable member theoretically stabilized by the first automatic control system, artificial vibrations for cancelling out the vibrations appearing on the rigid frame to be damped, the movable member is inserted between one of the two liquid filled chambers and a third chamber without liquid and possibly vented, the movable member is mounted in a rigid casing which is connected to the two rigid frames by respectively two portions of the elastomer spacer structure, the movable member and the force applying member which is associated therewith are mounted on that one of the two rigid elements from where the vibrations to be damped arrive, the force applying member is adapted so as to urge the movable member in one direction and a return spring is inserted, directly or not, between this movable member and one of the two rigid elements for urging the movable member in the opposite direction, the movable member is guided by at least one annular packing made from a cellular material, preferably with closed pores, the device is of double acting type in that its two chambers are disposed on each side of the movable member and are both of the working chamber type, i.e. each essentially defined by a resilient annular wall offering good resistance to axial compression and by portions of the two rigid elements between which this wall is inserted, the device comprises, associated with the same rigid element and symmetrical with each other with respect to the axis common to the two rigid elements, two complete assemblies formed by a movable member and the energizing member which is associated therewith, these assemblies being mounted so that the axes of the two movable members intersect and are preferably inclined with respect to each other by an angle of about 90°.

The invention comprises, apart from these main arrangements, certain other arrangements which are preferably used at the same time and which will be more explicitly discussed hereafter.

A few preferred embodiments of the invention will be described below with reference to the accompanying drawings in a way which is of course in no wise limitative.

Figure 2:
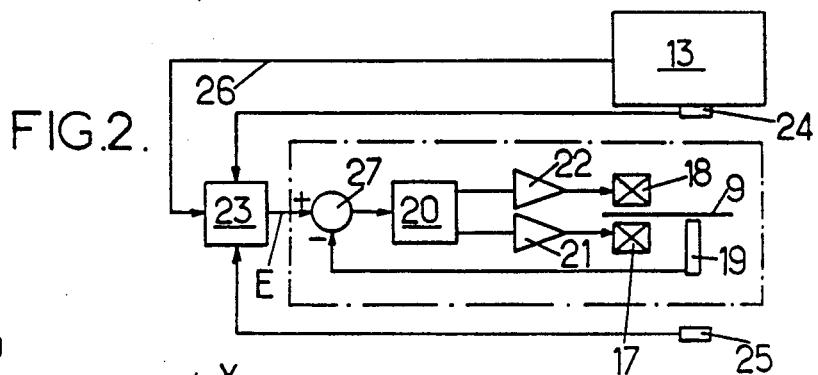
Figure 5:
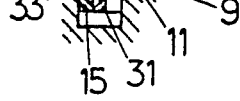
Figure 3:
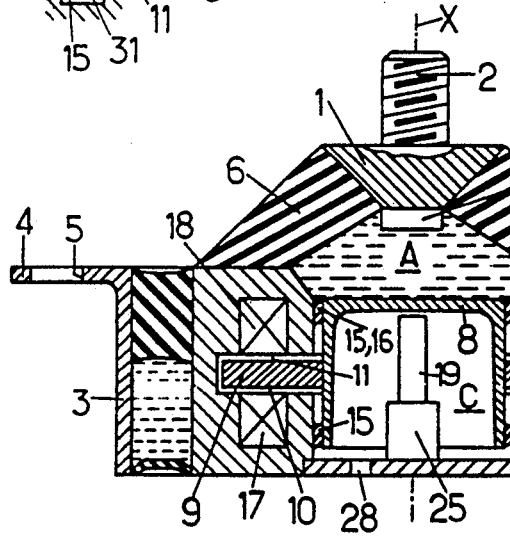
Figure 4:
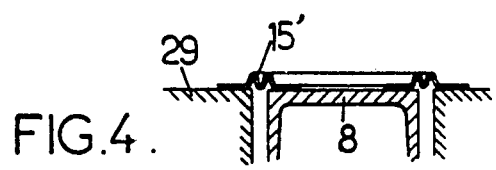
Figure 6:
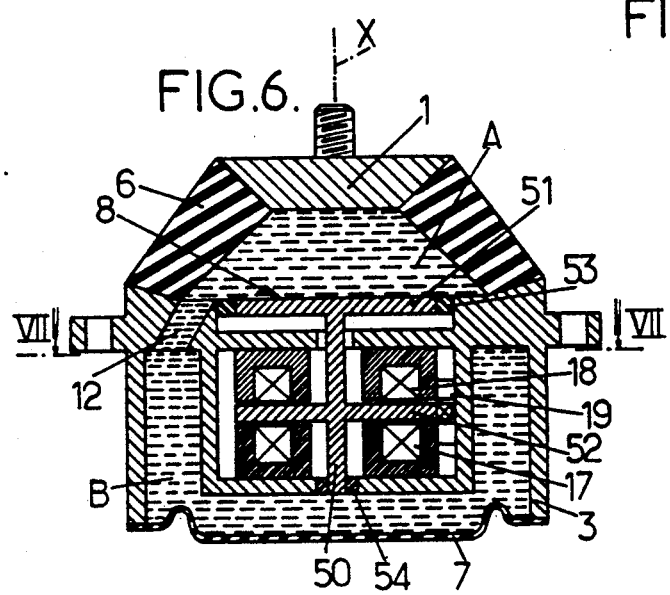
Figure 7:
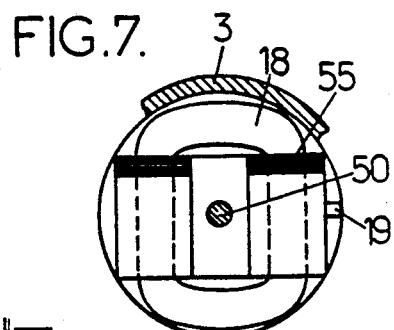
Figure 8:
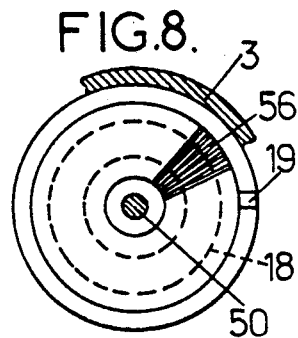
Figure 9:
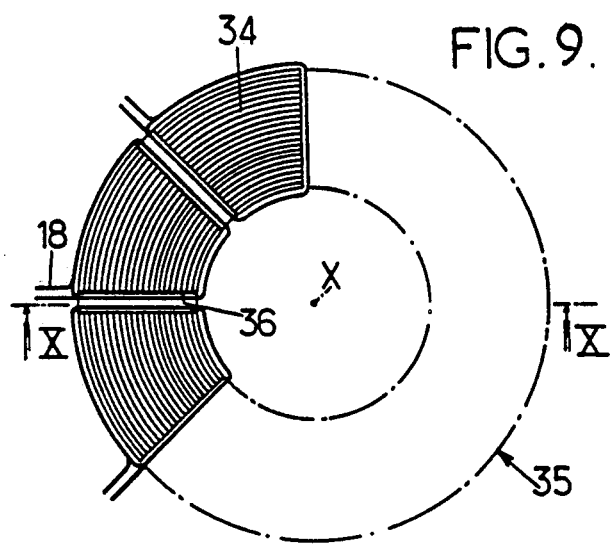
Figure 10:
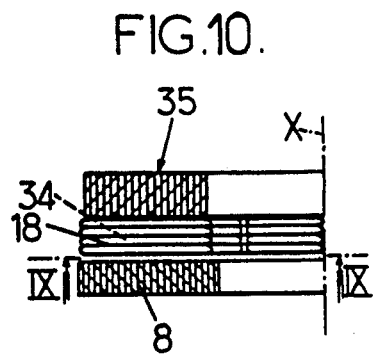
Figure 11:
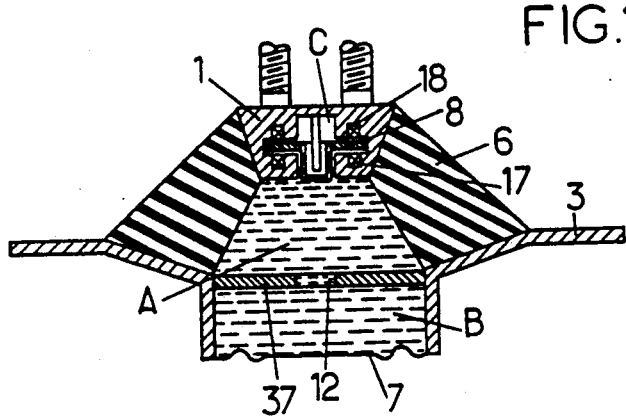
Figure 12:
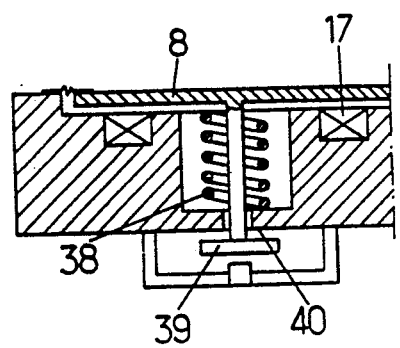
Figure 13:
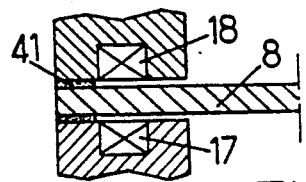
Figure 14:
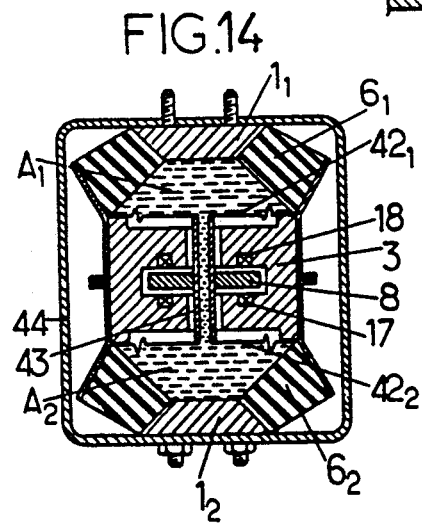
Figure 15:
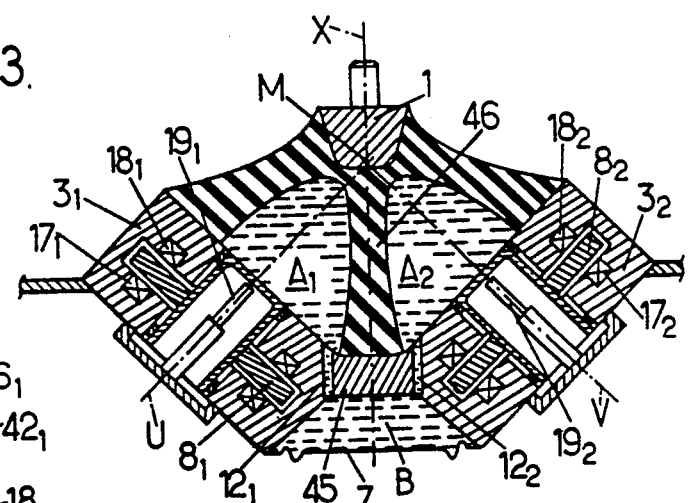

FIG. 1, of these drawings, shows schematically in axial section a hydraulic antivibratory support formed according to the invention, FIG. 2 is a diagram of automatic control system associated with this support according to the invention, FIG. 3 shows schematically in axial section a variant of the support according to the invention, FIG. 4 shows similarly another embodiment of a detail of this variant, FIG. 5 shows similarly a variant of a detail of the first embodiment, FIG. 6 shows schematically in axial section another support variant according to the invention, FIG. 7 is a cross section of FIG. 6 through VII—VII, FIG. 8 is a variant of FIG. 7, FIGS. 9 and 10 show, respectively in cross section through IX—IX in FIG. 10 and in half axial section through X—X in FIG. 9, the laminate construction according to the invention of parts forming a support variant according to the invention, FIG. 11 shows very schematically another support variant according to the invention, FIGS. 12 and 13 show details of two other supports according to the invention, FIGS. 14 and 15 show in schematic axial section two other supports according to the invention.

As is known, the support considered shown schematically in FIG. 1 comprises:

a rigid base 1 formed by a central stud extended upwards by a stub bolt 2, a rigid ring 3 extended outwardly by two lugs 4 themselves formed with fixing holes 5, a thick truncated cone shaped wall 6 made from rubber having good resistance to axial compression so as to play a "support" role and sealingly connecting base 1 to ring 3, a thin and flexible bellows 7 joined sealingly to ring 3 and defining a closed case with this ring, wall 6 and base 1, a movable member 8 dividing said case into two chambers, namely a work chamber A on the wall 6 side and a compensation chamber B on the bellows 7 side, movable member B being constituted by a flat disc whose periphery forms a collar or washer 9 housed with a clearance 10 in a groove 11 formed in ring 3, said clearance being about 0.5 mm on each side of the disc, a restricted passage 12 connecting the two chambers A and B together, which passage is here formed in the centre of movable member 8, and a liquid mass filling the two chambers and the restricted passage.

In the embodiments to which the invention preferably applies and which will be chosen by way of non limitative examples for the present description, the support assembly circularly surrounds or substantially circularly surrounds an axis X, the rigid base 1 supports an internal combustion engine 13 of a vehicle and the rigid ring 3 is mounted on the chassis 14 of this vehicle.

As is known, oscillations of relatively low frequency and high amplitude applied to chassis 14 cause the liquid to be alternately driven at the same frequency from one of the two chambers A and B into the other and conversely through passage 12. The oscillating liquid column contained in this passage is the seat of a resonance phenomenon when the frequency reaches a predetermined value which depends on the dimensions of the passage. This phenomenon results in a damping of the transmission of the original oscillations from one frame to the other.

In usual embodiments, movable member 8 is free to move in groove 11 and it is its natural vibrations which are used for filtering out the vibrations of relatively high frequency and low amplitude which are generated by the engine 13 so as to reduce the transmission of such vibrations to chassis 14.

It is these vibrations which it is proposed to control efficiently in accordance with the invention by controlling them artificially so that:

at least they cannot be neutralized periodically by the low frequency and high amplitude oscillation applied to one of the two rigid elements 1 and 3 with respect to each other, and preferably so that they are reinforced in order to cause "active attenuation" of the vibrations of the chassis up to complete suppression of such vibrations, by imposing appropriate counter vibrations on the chassis, i.e. vibrations whose frequency and amplitude are identical to those of the vibrations normally transmitted from the engine, but of opposite phase.

For this, the following are provided:

electrically controlled means adapted for imposing artificial counter vibrations on the movable member, automatic control means for detecting at all times the actual movements of the movable member and generating at all times, depending on the information thus collected concerning these actual movements, electric corrective signals which are introduced into the electric control means.

These electric control means for the counter vibrations of the movable member may be of any desirable kind and use magnetic, piezoelectric or other phenomena.

In the embodiment shown schematically in FIG. 1:

between the movable member 8 and its support there is provided a deformable ring 15 adapted to guide the movements of the movable member while making them possible exclusively in translation and parallel to the direction of axis X or "axial" direction and not in the radial direction perpendicular to this axis or swinging about a transverse axis, at least the washer forming the peripheral portion 9 of the movable member 8 is made from a ferromagnetic material, the washer 9 is isolated from liquid by at least one seal 16, in ring 3 two coils 17 and 18 are provided, on each side of washer 9, whose electric energization results in the application of axial forces of opposite directions on the washer 9, and a control system is provided for the automatic control of the energization of these two coils, comprising a sensor 19 detecting the movements of movable member 8, an electronic circuit 20 for processing the data collected by sensor 19 and two amplifiers 21 and 22 inserted respectively between circuit 20 and coils 17 and 18.

The guide ring 15 is advantageously formed by an elastomer ring which is not very compressible in the radial direction, but very easily deformable in the axial direction and works under shearing. Alternatively, the guide ring is deformed by a metal bellows working under flexion such as that designated by the reference 15' in the variant of FIG. 4.

Seal 16 must oppose a negligible resistance to the axial movements of movable member 8 and could in some cases be formed by the guide ring 15 itself if its position allows it to prevent liquid from penetrating into the air gap 11.

Coils 17 and 18 work after the fashion of a variable reluctance motor, generating high forces on the movable member which are oriented alternately in the two directions: they may be housed in a ferromagnetic material casing or yoke forming part or the whole of their common support.

Sensor 19 is formed in any desirable way, working for example on the LVDT ("Linear Variation Differential Transformer") principle or being of an inductive, capacitive or eddy current type.

The automatic control provided by the control system is such that, if it is used in isolation, it practically immobilizes movable member 8'. Any attempt at axial movement thereof in a given direction results instantaneously in the application thereon of a contrary antagonistic force tending to prevent such movement.

It is on the movable member whose position is thus controlled, that a corrective vibration will be artificially applied using the above coils 17 and 18 as well as their driving circuits 20 to 22.

More precisely, on the electronic circuit 20 there is provided a special input E for reception of the electric signals representative of such corrective vibration and these electric signals are produced in an appropriate attenuator circuit 23.

This attenuator circuit 23 receives information coming respectively from a vibration sensor 24 mounted on base 1 and so able to detect the vibrations imposed on this base by engine 13 and from a vibration sensor 25 mounted on ring 3 and so able to detect the residual vibrations which appear on chassis 14 as long as optimum adjustment of the assembly has not been obtained.

In some cases, a connection 26 is further formed between the engine 13 itself and the attenuator circuit 23, for example for synchronisation purposes.

In FIG. 2, a subtracter circuit is shown schematically at 27 disposed at the input E and receiving both the electric signals delivered by sensor 19 and those delivered by the attenuator circuit 23, the difference between these signals being worked out at this level before application of the resultant signals to circuit 20.

This second automatic control system 23-26 allows imposed vibrations to be applied to movable member 8 whose characteristics (frequency, amplitude, phase) are practically identical to those of the natural vibrations of the movable member which would have occurred in the absence of the two automatic control systems.

In this case, damping effects are obtained of the kind obtained by the natural vibrations.

But here these vibrations are imposed on movable member 8 while maintaining its mean position in the middle of the axial width of groove 11, so that there is no risk of its abutting against, the opposite faces of the groove, the amplitude of the vibrations being less than the clearance 10, for example of about 0.1 mm if this clearance is 0.5 mm: in particular, there is no risk that such useful vibrations cease at the rhythm of possible low frequency and high amplitude oscillations as has been described above.

Thus, the second control system allows vibrations to be applied to movable member 8 which are even more corrective than the preceding natural vibrations, in particular by conferring on these corrective vibrations amplitudes greater than those of the natural vibrations, but of course still less than clearance 10.

The assembly therefore makes it possible to generate an "active attenuation" of the vibrations to be damped, which makes it possible at the limit to wholly suppress those at the level of chassis 14.

In FIG. 3 is shown schematically a variant of the support schematized in FIG. 1, in which variant the elements identical or comparable to those described above bear the same references as before.

This variant differs essentially from the preceding one by the following points:

1. Instead of being inserted between the two liquid chambers A and B, movable member 8 is here inserted between the first liquid chamber A and a third chamber C which is without liquid and advantageously vented through at least one appropriate orifice 28.

This arrangement is such as to increase the sensitivity of the device, for then only one of the two faces of movable member 8 is in contact with the liquid, which facilitates the control of its movements.

2. Groove 11 is then formed in an annular ferromagnetic block 29 independent of ring 3 and the second liquid chamber B is transferred to the periphery of this block 29, this second chamber B being then annular and defined outwardly by ring 3, inwardly by block 29 and, between these two rigid parts, on the one hand by an annular spacer 30 formed of a resilient material and, on the other hand, by a thin and flexible annular membrane forming bellows 7, and the restricted passage 12 here being a channel formed in said block 29.

Such a construction permits filtering out of the high frequencies by the simple inertia of block 29, which is relatively heavy and is suspended between the two elastomer spacers 6 and 30.

3. Instead of having the form of a flat disc, as before, movable member 8 here has the form of a cylindrical pot with flat bottom surrounded at mid height by the external radial ferromagnetic material collar 9 housed with clearance in the annular groove 11.

This movable member 8 is guided in block 29 by two rings 15 adhered respectively to these two parts and disposed axially on each side of collar 9, which rings are only slightly deformable radially but offer negligible resistance to deformation under shearing in the axial direction.

One of these two rings serves at the same time as seal 16 preventing the liquid contained in chamber A from accessing to collar 9.

Sensors 19 and 25 are both disposed axially in the centre of the support, inside the pot forming movable member 8.

In a variant, the above annular spacer 30 is formed by a rigid part joining firmly together block 29 and ring 3.

In another variant, the peripheral edge of movable member 8 is extended axially, preferably on each side thereof, by a flange 31 (FIG. 5) having a relatively large axial dimension, ring 15 which guides movable member 8 then comprises at least two annular portions inserted radially between the bottom 32 of groove 11 and the side 33 of the axial ends of the flange: this construction improves guidance of the movable member and in particular increases its resistance to swinging about transverse axes.

In yet another variant, the ferromagnetic portion 9 of movable member 8 and coils 17 and 18 which surround it are disposed close to axis X, the portion of the movable member in contact with the liquid then being disposed at the periphery of this movable member.

In the variant shown schematically in FIG. 6, movable member 8 is in the form of a table comprising a central single leg 50 and two circular parallel plates 51 and 52.

The upper face of the upper plate 51 is placed in contact with the liquid present in the work chamber A and the bottom of leg 50 is placed in contact with the liquid in the compensation chamber B.

Two narrow annular elastomer seals 53 and 54 connect the periphery of the upper plate 51 and the base of leg 50 respectively sealingly to the rigid body of frame 3 and ensure axial translational guiding of the movable member assembly.

The annular periphery of the intermediate plate, 52, which forms the ferromagnetic element of the movable member, is inserted axially between the two fixed coils 17 and 18 carried by body 3.

It can be seen that these two coils have leg 50 passing therethrough and that one of them is inserted axially between the two plates 51 and 52.

In a variant, leg 50 and seal 54 may be totally contained inside a sealed case formed by frame 3, plate 51 and seal 53, without the base of this leg being flush in chamber B.

In an advantageous arrangement, a laminate construction is adopted for the magnetic circuit associated with coils 17 and 18 which considerably reduces the heating and losses in the iron.

For this, for example, the magnetic circuit associated with each coil is formed by at least one tunnel open towards the air gap and formed by stacking identical ferromagnetic material plates insulated electrically from each other and having the form of a thick U:

in the embodiment of FIG. 7, each of the circuits comprises two such rectilinear, parallel and identical tunnels, each formed by jointingly stacking such plates 55, the winding of the wire forming coil 17 or 18 then having the form of a transversely stretched ring, in the embodiment of FIG. 8, each of the circuits comprises a single circular tunnel with axis X and the different plates 56 extend parallel to axis X and are disposed radially in the form of a star from this axis, the wedge shaped gaps then formed between the successive plates being filled with a non magnetic material.

In the variant illustrated in FIGS. 9 and 10, each coil 17, 18 is wrapped around one of axial cores 34.

These cores 34 are formed in the following way.

A flat annular disc 35 is formed first of all by rolling a magnetic material strip about axis X.

One of the flat faces of this disc includes radial grooves 36, and between these grooves flat ribs in the form of circular sectors forming the cores 34: it is about these cores that the electric wire forming coils 17 and 18 are wound.

The annular uninterrupted portions of the disc 35 serve for completing the magnetic circuits.

The different windings are preferably connected electrically in parallel which distributes the magnetic forces applied to the movable member over the whole periphery thereof and thus simplifies the system for guiding this movable member.

The assembly of the ribbed disc and these windings is enclosed in a casing (not shown) which is made from a non magnetic material such as a moulded plastic material.

Movable member 8 is also laminated, being formed more particularly by a magnetic strip wound on itself about axis X, as can be seen in FIG. 10, or by star shaped plates of the same kind as plates 56 of FIG. 8.

In usual embodiments, it is rather the central stud 1 than the annular frame 3 which is connected to the vehicle engine.

The vibrations to be damped being preferably in general those generated by operation of said engine, it is then through base 1 that these vibrations reach the anti-vibratory support considered and it is then especially on frame 3 that it is desirable to suppress the vibrations.

In the previously envisaged embodiments, in which movable member 8 is mounted on the frame 3, it is indirectly this latter which may be called upon to partially absorb the attenuating counter vibrations, generated by coils 17 and 18.

In an improvement of the present invention, movable member 8 as well as its energizing coils are mounted directly on base 1, as can be seen in FIG. 11.

The transmission of the vibrations from base 1 to frame 3 is not modified, but this variant avoids the creation, on frame 3, of undesirable parasite vibrations which may accompany some attenuating counter vibrations, in particular at the times of modification of the operating frequency of the device.

In this case, the restricted passage 12 is formed, not in movable member 8 but in a rigid intermediate dividing wall 37 fast with frame 3 and the face, of movable member 8, which is not oriented towards chamber A, defines an air chamber C which may be vented.

In another improvement, one of the two electric coils capable of exerting tractive or axial repellent forces on movable member 8 is replaced by a return spring such as the helical compression spring 38 shown in FIG. 12.

Apart from the advantage of halving the number of coils and their electric supply conductors, this variant has the further advantage of placing in contact with the damping liquid a larger part of the movable member surface, which improves the efficiency, for a given movable member diameter.

During operation of the support equipped with such a spring 38, the single remaining coil 17 is permanently energized electrically so that movable member 8 at rest is in a mean position: it is about this mean position that it is caused to vibrate during operation of the support.

The assembly is such that, when the electric supply to the single coil 17 is cut off, movement of movable member 8 due to expansion of spring 38 is limited by an appropriate stop 39 connected to this movable member abutting against a fixed appropriate surface 40 of the device.

In yet another improvement, the flexible seal 15 provided for guiding the rectilinear movements of movable member 8 is formed by at least one ring 41 (FIG. 13) made from a cellular material inserted between an edge of the movable member and the facing rigid part.

If the pores of this cellular material are closed, each ring 41 may also serve as seal after the fashion of those designated by the above reference 16.

In another improvement, shown schematically in FIG. 14, the two chambers A1, A2 of the device are of the same so-called "working" type: they are both defined by a central base $1_1$, $1_2$, by an annular resilient wall $6_1$, $6_2$ offering good axial compression resistance and preferably of a truncated cone shape, by a portion of a central annular frame 3 and by a "movable member" of the kind designated by the reference 8 above or more precisely by a sealed membrane $42_1$, $42_2$ whose periphery is fixed sealingly to frame 3 and whose perforated centre is fixed on an end of a rigid central tube 43 passing through a movable member 8 and secured to this movable member.

The two central bases $1_1$, $1_2$, are secured mutually together by a rigid appropriate framework such as a hoop or stirrup 44.

The two chambers A1 and A2 communicate together through tube 43 which defines the "restricted passage" of the support considered.

As shown in FIG. 14, said support is preferably symmetrical with respect to a transverse median plane.

This variant has the advantage of excellent efficiency: in fact, the two faces of the movable member or more precisely the faces of the two membranes $42_1$, $42_2$ which are the furthest away from movable member 8 are in contact with the liquid contained in a work chamber (A1, A2) and may therefore contribute to the desired damping.

In yet another embodiment illustrated in FIG. 15, the support comprises as before a central base 1 with axis X.

But the single annular frame 3 of the embodiment of FIG. 1 is here replaced by two annular frames $3_1$, $3_2$ which are of revolution respectively about two axes U and V both intersecting axis X at the same point M and symmetrical with respect to each other relatively to this axis X, the angle formed between the two axes U and V being preferably equal to 90°.

The two frames $3_1$ and $3_2$ are joined together by a bridge 45 and each of the two frames $3_1$ and $3_2$ is associated with a movable member ($8_1$, $8_2$)—electric coil ($17_1$, $18_1$; $17_2$, $18_2$) assembly of the same type as those described above.

The work chambers co-acting with each of these two assemblies are also split up (A1, A2) by an inner web 46 forming part of wall 6 and each communicates through a restricted passage which is assigned thereto ($12_1$; $12_2$) with a common compensation chamber B defined on the one hand by a portion of each of frames $3_1$ and $3_2$ and on the other by a bellows 7.

Sensors may be further seen in FIG. 15 at $19_1$, $19_2$ for detecting the movements of the two movable members $8_1$ and $8_2$.

But for simplicity's sake, references have not been given in this FIG. 15 for the different guide and sealing members which are however of course provided as described above.

With such a bi- directional assembly, an oscillation applied to stud 1 in the direction of axis X is damped by a half by respectively each of the two assemblies formed respectively about the two axes U and V and, to attenuate as much as possible the resultant vibrations of movable members $8_1$, $8_2$, identical AC voltages should be applied respectively to the two pairs of coils which control the movements of these two movable members.

If, on the contrary, the two voltages applied respectively to these two pairs of coils are in phase opposition, the resultant attenuation force which is exerted on the assembly of the two annular frames $3_1$, $3_2$ with respect to base 1 is oriented in a direction perpendicular to axis X.

Thus a particularly simple means is available for damping at will oscillations exerted in two directions perpendicular to each other.

Following which and whatever the embodiment adopted, hydraulic antivibratory supports are finally obtained whose construction, operation and advantages are sufficiently clear from the foregoing.

It should be understood that the invention is not limited to those of its modes of application and embodiments which have been more especially considered; it embraces, on the contrary, all variants thereof, particularly:

those in which the antivibratory device is a sleeve working essentially in a diametrical direction and for which the two rigid frames are tubular, one surrounding the other and preferably of revolution and coaxial at least under load, and those in which the artificial counter vibrations imposed on the valve are generated otherwise than by electric coils co-acting with a ferromagnetic element forming this valve, these counter vibrations being for example generated by electric energization of a winding carried by the valve itself and immersed in a magnetic field which may be generated by a fixed permanent magnet.

I claim:

1. A hydraulic antivibratory device for insertion between and connection to two rigid elements, comprising:

a pair of rigid frames firmly connectable, respectively, one to each of the two rigid elements;

an elastomer spacer structure connecting the two frames together and forming partially therewith two sealed chambers, a restricted passage placing the two sealed chambers into permanent communication with each other;

a liquid mass filling the two chambers and the restricted passage;

at least one rigid movable member having a surface partially defining at least one of the two chambers, said movable member being mounted for limited oscillating movement along an axis generally perpendicular to said surface, guide means for guiding said movable member for movement substantially only in directions parallel to said axis;

at least one electrically energized force applying means for applying to said movable member a force in at least one of two opposite directions parallel to said axis;

sealing means for sealing that portion of said movable member adjacent to the force applying means;

a control system for making the supply of electric power to the electrically energized force applying means dependent on movements of said movable member, such that energization of the electrically energized force applying means is capable of reducing, which includes canceling out, movements of the movable member;

said control system comprising a sensor for detecting said movements in the vicinity of the movable member.

2. A hydraulic antivibratory device according to claim 1, wherein said electrically energized force applying means includes means for applying the alternating forces to said movable member in the two opposite directions parallel to said axis.

3. A hydraulic antivibratory device according to claim 2, wherein said electrically energized force applying means comprises at least one electric wire winding carried on said movable member and said device further includes means for applying a permanent magnetic field to said winding.

4. A hydraulic antivibratory device according to claim 2, wherein said device includes two sensors for detecting vibrations of said two rigid frames and a second control system for supplying power to said force applying means based on signals sensed by said two sensors.

5. A hydraulic antivibratory system according to claim 4, wherein said first control system causes said electrically energized force applying means to stabilize said movable member and said second control system causes said electrically energized force applying means to exert a force on said movable member which cancels out vibrations in at least one of said two rigid frames.

6. A hydraulic antivibratory device according to claim 2, wherein said movable member is inserted between one of said two sealed chambers and a third non-liquid filled chamber.

7. A hydraulic antivibratory device according to claim 6, wherein said third non-liquid filled chamber includes a vent.

8. A hydraulic antivibratory device according to claim 6 wherein said movable member is mounted in a block which is connected to said two rigid frames by two portions of said elastomer spacer structure.

9. A hydraulic antivibratory device according to claim 2, wherein said movable member and said force applying means are mounted within one of said two rigid frames.

10. A hydraulic antivibratory device according to claim 2, wherein said device further includes an annular packing for guiding the movement of said movable member, said annular packing comprising a cellular material.

11. A hydraulic antivibratory device according to claim 2, wherein said two sealed chambers comprise working chambers disposed on opposite sides of said movable member, each said working chamber being defined by a resilient annular wall for resisting axial compression and by portions of the two rigid frames between which said resilient annular wall is located.

12. A hydraulic antivibratory device according to claim 2, wherein said at leas tone movable member comprises two movable members and said device includes an electrically energized force applying means for each of said movable members which applies to a respective movable member alternating forces in the two opposite directions parallel to the axis along which the respective movable member oscillates.

13. A hydraulic antivibratory device according to claim 2, wherein said axes of oscillation of said two movable members are inclined with respect to each other by an angle of about 90°.

14. A hydraulic antivibratory device according to claim 2, wherein said movable member includes a laminate ferromagnetic element and said force applying means comprises a plurality of electric coils, each of said electric coils being wrapped around a fixed laminate magnetic circuit and being separated by a space from said laminate ferromagnetic element.

15. A hydraulic antivibratory device according to claim 14, wherein said laminate ferromagnetic element comprises a flat disc, each said laminate magnetic circuit comprising a U-shaped stack of metal sheets and each said laminate magnetic circuit including rectilinear tunnels therethrough.

16. A hydraulic antivibratory device according to claim 14, wherein said laminate ferromagnetic element comprises a flat disc and each said laminate magnetic circuit comprises a stack of metal sheets including a circular tunnel therethrough, said metal sheets extending radially outward from said axis.

17. A hydraulic antivibratory device according to claim 14, wherein said movable member comprises a central leg extending axially through said device and two parallel circular plates extending perpendicularly from said leg, an upper plate of said circular plates including an upper face which defines a wall of one of said sealed chambers and said ferromagnetic element comprising at least an annular external portion of an intermediate plate of said circular plates.

18. A hydraulic antivibratory device according to claim 14, wherein each said laminate magnetic circuit circularly surrounds said axis and said force applying means comprises a pair of oppositely facing flat annular discs, cores in the shape of circular sectors extending axially from said disc and electric coils wrapped around said cores.

19. A hydraulic antivibratory device according to claim 1, wherein said device includes a return spring between said movable member and one of said rigid elements for urging said movable member in a direction opposite to the direction of the force applied by said electrically energized force applying means.

* * * * *